US009400400B2

(12) United States Patent
Ur

(10) Patent No.: US 9,400,400 B2
(45) Date of Patent: *Jul. 26, 2016

(54) PROGRESSIVE LENSES

(71) Applicant: Shmuel Ur, D.N. Misgav (IL)

(72) Inventor: Shmuel Ur, D.N. Misgav (IL)

(73) Assignee: Shmuel Ur Innovation Ltd. (IL)

( * ) Notice: Subject to any disclaimer, the term of this patent is extended or adjusted under 35 U.S.C. 154(b) by 13 days.

This patent is subject to a terminal disclaimer.

(21) Appl. No.: 14/573,566

(22) Filed: Dec. 17, 2014

(65) Prior Publication Data

US 2015/0103309 A1    Apr. 16, 2015

Related U.S. Application Data

(63) Continuation of application No. 13/746,058, filed on Jan. 21, 2013, now Pat. No. 8,944,593.

(51) Int. Cl.
*G02C 7/06* (2006.01)
*G02C 7/02* (2006.01)
*G02C 7/04* (2006.01)

(52) U.S. Cl.
CPC ............... *G02C 7/066* (2013.01); *G02C 7/024* (2013.01); *G02C 7/027* (2013.01); *G02C 7/041* (2013.01); *G02C 7/061* (2013.01)

(58) Field of Classification Search
CPC ................. G02C 7/027; G02C 7/041–7/045; G02C 7/061

USPC ............. 351/159.05, 159.06, 159.08, 159.41, 351/159.42, 159.43, 159.74, 159.75
See application file for complete search history.

(56) References Cited

U.S. PATENT DOCUMENTS

| 4,786,160 A | 11/1988 | Furter |
| 5,002,382 A | 3/1991 | Seidner |
| 7,344,245 B2 | 3/2008 | Fisher |
| 2010/0097570 A1 | 4/2010 | Katzman et al. |

FOREIGN PATENT DOCUMENTS

EP    2224276 A1    9/2010

OTHER PUBLICATIONS

International Search Report and Written Opinion dated Apr. 1, 2014 in related International Application No. PCT/IL2013/051010.

*Primary Examiner* — Darryl J Collins
(74) *Attorney, Agent, or Firm* — Koffsky Schwalb LLC; Mark I. Koffsky

(57) ABSTRACT

A method comprising: performing eye exam to a subject having a first and second eye; determining a prescription for the first and second eyes, the prescription describing focal power for each of the first eye and the second eye for at least three distances; and providing the prescription to a machine that produces progressive glasses that comprise a first and second lenses, wherein the first and second lenses each having at least three focal portions associated with the at least three distances that are located in a same height in the glasses thereby enabling clear vision for the subject in the first eye and the second eye with respect to the at least three distances.

10 Claims, 3 Drawing Sheets

PROGRESSIVE LENSES

TECHNICAL FIELD

The present disclosure relates to lenses in general, and to progressive lenses, in particular.

BACKGROUND

Progressive spectacle lenses, also called Progressive Addition Lenses (PAL), progressive power lenses, graduated prescription lenses, Progressive Lenses and Varifocal or multifocal lenses, are corrective lenses usually used to correct disorders on the eye's ability to change focus to see near objects clearly.

The progressive lenses are often referred to as no-line bifocals. Bifocal lenses contain portions for near and distance vision, separated by a distinct line. Bifocal lenses bring the vision into focus when looking at a far distance and bring the near vision into focus when viewing close objects, without having to take the glasses on or off. The progressive lenses contain the different viewing portions, but have no visible lines to separate the viewing portions. Instead, progressive lenses have an upper distance portion ('the distance zone'), a lower near portion ('the near zone'), and a progressive corridor ('the intermediate zone') there between which provides a gradual power progression from the distance zone to the near zone. The progressive lenses may be characterized by the gradient of increasing lens power.

BRIEF SUMMARY

One exemplary embodiment of the disclosed subject matter is a method comprising: having a description of a lens adapted for an eye, wherein the lens comprising a first focal portion associated with a first distance and a second focal portion associated with a second distance, and wherein the lens comprising an intermediate portion having gradient change in optical power between a first power and a second power associated with the first and second focal portions respectively; and identifying, based on a prescription for the eye, an intermediate focal portion associated with an intermediate distance, wherein the intermediate distance is between the first and second distances; and planning a counterpart lens adapted for a counterpart eye based upon focal power required by the counterpart eye to achieve focus at the first distance, the second distance and the intermediate distance, wherein the counterpart lens comprising a first, a second and an intermediate focal areas, wherein the first, second and intermediate focal areas are located in locations parallel to locations of the first, second and intermediate focal portions, respectively, wherein the counterpart lens comprising a first gradient change in optical power between the first and intermediate focal areas and a second gradient change in optical power between the intermediate and second focal areas.

In some exemplary embodiments, said identifying comprises identifying a plurality of intermediate focal portions associated with a plurality of intermediate distances, and wherein the counterpart lens comprising a plurality of intermediate focal areas, wherein the plurality of focal areas are located in locations parallel to locations of the plurality of intermediate focal portions.

In some exemplary embodiments, a counterpart lens comprising gradient changes in optical power between the first focal area and the second focal area through the plurality of intermediate focal areas.

In some exemplary embodiments, a first gradient change of a different change rate than the second gradient change.

In some exemplary embodiments, producing the lens or the counterpart lens.

In some exemplary embodiments, producing glasses comprising the lens and the counterpart lens, wherein the glasses are adapted to a being having the eye and the counterpart eye.

In some exemplary embodiments, producing contact lenses for the eye and the counterpart eye, wherein the contact lenses comprising the lens and the counterpart lens.

In some exemplary embodiments, obtaining a first prescription for the eye, the first prescription comprising one or more focal portion prescriptions, each of which referring to a different distance out of a set of distances; and obtaining a second prescription for the counterpart eye, the second prescription comprising one or more focal area prescriptions, each of which referring to a different distance out of the set of distances; and wherein said planning is based upon the first and second prescriptions.

In some exemplary embodiments, obtaining the set of distances and performing an eye test to determine the first and second prescriptions.

Another exemplary embodiment of the disclosed subject is a first lens and a second lens, wherein each of the first and second lenses comprises: a first focal portion associated with a first distance, a second focal portion associated with a second distance, and an intermediate portion having gradient change in optical power between a first optical power and a second optical power associated with the first and second focal portions respectively; wherein the first lens and the second lens are adapted for a first eye and a second eye respectively, based upon focal power required by the first and second eyes to achieve focus at the first distance, the second distance and at least one intermediate distance in between the first and the second distances; wherein the first, second and intermediate focal portions of the first lens are located in locations parallel to locations of the first, second and intermediate focal portions of the second lens, respectively; wherein the intermediate portion of the second lens comprising: a first gradient change in optical power between an optical power associated with the first distance and an optical power associated with the at least one intermediate distance; and a second gradient change in optical power between an optical power associated with the at least one intermediate distance and an optical power associated with the second distance.

In some exemplary embodiments, the first gradient change of a different change rate than the second gradient change.

In some exemplary embodiments, the gradient change of the intermediate portion of the first lens is of a constant change rate.

In some exemplary embodiments, corrective eyeglasses may comprise the first and second lenses.

In some exemplary embodiments, contact lenses may comprise the first and second lenses.

In some exemplary embodiments, the at least one intermediate distance comprises a first intermediate distance and a second intermediate distance, wherein the first gradient change is associated with the first intermediate distance, wherein the second gradient change is associated with the second intermediate distance, and wherein the intermediate portion of the second lens comprising a third gradient change in optical power between an optical power associated with the first intermediate distance and an optical power associated with the second intermediate distance.

In some exemplary embodiments, a machine configured to produce the lenses based on a prescription for the first and second eyes indicating the focal power required by the first and second eyes to achieve focus and the first distance, the second distance and the at least one intermediate distance.

Yet another exemplary embodiment of the disclosed subject is a method comprising: performing eye exam to a subject having a first and second eye; determining a prescription for the first and second eyes, the prescription describing focal power for each of the first eye and the second eye for at least three distances; and providing the prescription to a machine that produces progressive glasses that comprise a first and second lenses, wherein the first and second lenses each having at least three focal portions associated with the at least three distances that are located in a same height in the glasses thereby enabling clear vision for the subject in the first eye and the second eye with respect to the at least three distances.

In some exemplary embodiments, producing, by the machine, the progressive glasses.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
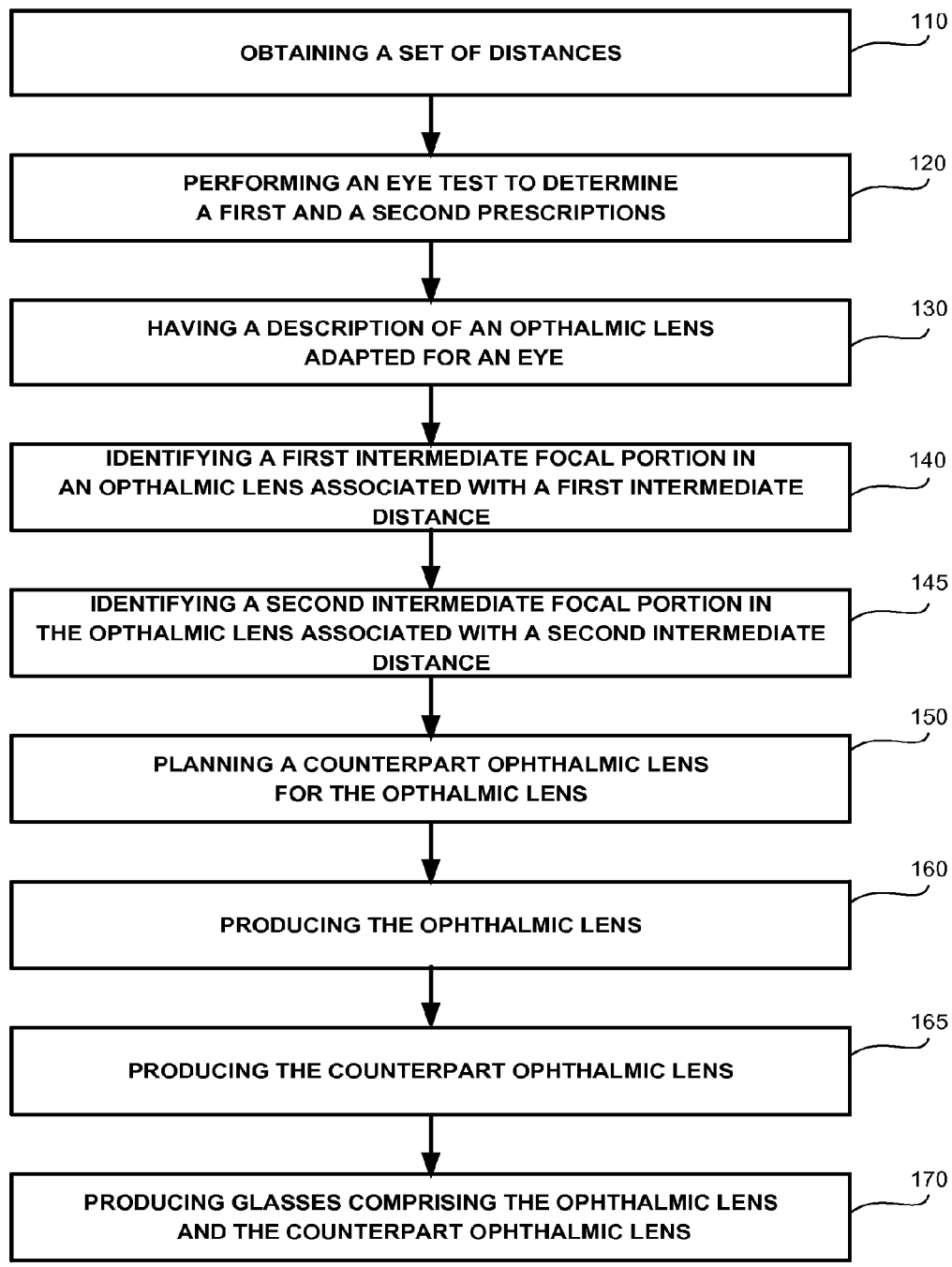
FIG. 1 shows a flowchart diagram of a method in accordance with some exemplary embodiments of the disclosed subject matter.

A progressive lens is an ophthalmic lens that comprises two focal zones, referred to as a first and a second focal zones, that bring into focus objects that are in a specific range of distance (a first and a second distances, respectively). In some embodiments, the zones are arranged in substantially vertically to one another, wherein the first zone is above the second zone. In some exemplary embodiments, the first zone may be associated with a range of distances that are considered as "far", such as about 3 meters. In some exemplary embodiments, the second zone may be associated with a range of distances, which are considered as "near", such as about 30 centimeters.

The progressive lens may further comprise a progressive corridor, referred to as an intermediate focal zone. The intermediate focal zone may be located between the first focal zone and the second focal zone. The progressive corridor may provide a gradual power progression from an optical power of the first focal zone to an optical power of the second focal zone. In some exemplary embodiments, the intermediate focal zone may be viewed as a sequence of focal zones, each of which associated with a different optical power useful for a different distance, in between the distances of the first and second focal zones.

One technical problem dealt with by the disclosed subject matter is enabling a user of lenses comprising intermediate focal zone, to look at an object located at a distance in the range between the first and the second distances, and to see the object in focus in both eyes. In order to see clearly an object located at a distance in the range between the first and the second distances, the user may have to tilt his or her head until he or she is looking through a focal zone corresponding to the appropriate focal power for that distance. In some cases, for example, when the first or second focal zones of the two lenses have different optical power, the progressive corridors of the two lenses, are not identical. As a result of the differences between the progressive corridors, the focal zone of a specific distance located at a distance in the range between the first and second distances, may not be located at the same height on both of the lenses. Therefore, when the user is looking through the focal zone corresponding to the appropriate focus for the distance in which the object is located on, one eye may be out of focus. In such a case, it may be desired to have the focal zone of a specific distance in the range between the first and the second distances, located on the same height on the two lenses.

One technical solution is to provide lenses comprising intermediate focal zones, which are coordinated in a way that the location of focal zones related to specific distances, are located on the same height on the two lenses. This way when a user is looking at an object located on a specific distance in the range between the first and the second distances, and adjusts the angle of viewing so that the object is in focus for one eye, the object will also be in focus for the other eye.

Another technical solution is to produce lenses comprising intermediate focal zones, that are coordinated in a way that the location of a focal zone related to specific distance in the range between the first and the second distances, is located on the same height on the two lenses.

Yet, another technical solution is having a first lens adapted for one eye, and planning a second lens adapted for a second eye. Focal zones related to specific distances in the range between the first and second distances of the second lens are planned to be located on the second lens in correlation with the location of the focal zones related to the specific distances on the first lens. In some exemplary embodiments, the planned lens may be produced based on plan.

Referring now to FIG. 1 showing a flowchart diagram of a method in accordance with some exemplary embodiments of the disclosed subject matter.

In Step 110, a set of distances may be defined. In some exemplary embodiments, the set of distances is defined with respect to expected use of the lenses, for example, if the lenses are used by human at his work space, a first distance may refer to the distance between the user eyes and a book placed on a desk, a second distance may refer to the distance between the user eyes and computer screen, a third distance may refer to the distance between the user eyes and a person sitting on the other side of the desk, and a fourth distance may refer to the distance between the user eyes and a television located on the other side of the room. In some exemplary embodiments, the set of distances is defined with no regard to a specific user, or specific usage.

In Step 120, an eye test may be performed to determine a first prescription and a second prescription. The prescriptions may be determined for a first eye and a second eye of a subject, respectively. In some exemplary embodiments, the prescriptions describe the focal power needed for the subject to see clearly objects located at specific distances using the eye. Additionally or alternatively, the prescriptions may describe the focal power needed for the subject to see clearly objects located at the distances defined on Step 110.

In Step 130, a description of an ophthalmic lens adapted to an eye is obtained. In some exemplary embodiments, the description of the ophthalmic lens may be used to produce the ophthalmic lens. Additionally or alternatively, the description of the ophthalmic lens may be used to plan or produce a counterpart ophthalmic lens for a counterpart eye. In some exemplary embodiments, the description of the ophthalmic lens may be a description of a progressive lens comprising a first focal zone, a second focal zone and intermediate focal zone. In some exemplary embodiments, the description of the ophthalmic lens may be based on a prescription determined on an eye test as described in Step 120. Additionally or alternatively, the description of the ophthalmic lens may be the outcome of analyzing a produced ophthalmic lens. In some exemplary embodiments, the produced ophthalmic lens may be analyzed to provide the description useful for the disclosed subject matter.

In Step 140, a first intermediate focal portion associated with a first intermediate distance may be identified on the ophthalmic lens. In some exemplary embodiments, the ophthalmic lens may be a progressive lens comprising a progressive corridor that provides a gradual power progression from an optical power of the first focal zone to an optical power of the second focal zone and the first intermediate focal portion may be located on the intermediate zone of the progressive lens. Additionally or alternatively, the first intermediate distance may be one of the set of distances of Step 110. In some exemplary embodiments, the identification of the first intermediate focal portion may be the outcome of analyzing the description of Step 130. Additionally or alternatively, the identification of the first intermediate focal portion may be based on one of the prescriptions of Step 120. Additionally or alternatively, the identification of the first intermediate focal portion may be the outcome of analyzing the ophthalmic lens adapted for the eye of the subject.

In Step 145, a second intermediate focal portion associated with a second intermediate distance may be identified on the ophthalmic lens. In some exemplary embodiments, the second intermediate focal portion may be identified in the same ways that the first intermediate focal portion may be identified. Additionally or alternatively, the second intermediate distance may be one of the set of distances of Step 110.

In some exemplary embodiments, the number of identified intermediate focal portions associated with intermediate distances may not be limited to two. In some exemplary embodiments, the number of identified intermediate focal portions associated with intermediate distances may be the number of distances of the set of distances defined in Step 110. Additionally or alternatively, the number of identified intermediate focal portions associated with intermediate distances may be the number of distances of the set of distances defined in Step 110 minus two, as the distances defined in Step 110 may comprise the distances associated with the first and second focal portions. In some exemplary embodiments, the method shown on the flowchart diagram of FIG. 1 may comprise steps additional to the steps shown in FIG. 1. In some exemplary embodiments, steps similar to Step 140 and Step 145 may be performed in order to identify additional intermediate focal portions associated with additional intermediate distances.

In Step 150, a counterpart ophthalmic lens for the ophthalmic lens may be planned. In some exemplary embodiments, the counterpart ophthalmic lens may be a progressive lens. In some exemplary embodiments, the counterpart ophthalmic lens may be planned to comprise one or more focal portions associated with the intermediate distances of Steps 140 and 145, located on the counterpart ophthalmic lens at corresponding positions to positions of the intermediate focal portions associated with same distances, in the ophthalmic lens. In some exemplary embodiments, the corresponding positions may be substantially parallel position, such as at the same height. Additionally or alternatively, the focal portions located at the same height on both lenses may be located on the intermediate zone of the progressive lens.

In Step 160, an ophthalmic lens may be produced. In some exemplary embodiments, the ophthalmic lens may be produced based on the description of an ophthalmic lens of Step 130. Additionally or alternatively, the ophthalmic lens may be a-priori produced.

In Step 165, a counterpart ophthalmic lens may be produced. In some exemplary embodiments, the counterpart ophthalmic lens may be produced based on the plan of Step 150.

In Step 170, glasses comprising the ophthalmic lens and the counterpart ophthalmic lens are produced. In some exemplary embodiments, the glasses are produced for human use. Additionally or alternatively, contact lenses comprising the ophthalmic lens and the counterpart ophthalmic lens may be produced.

Figure 2:
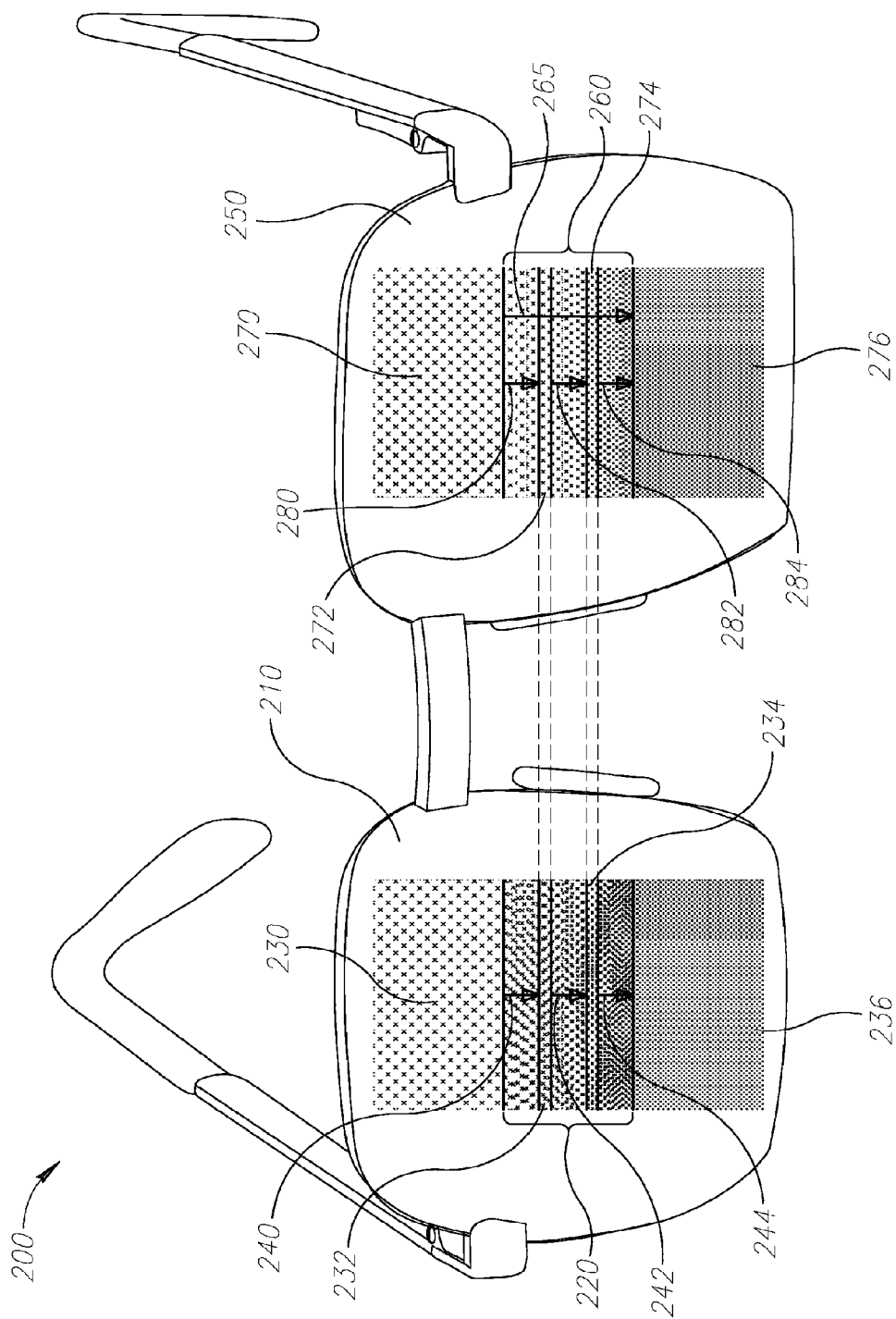
FIG. 2 shows a set of lenses, in accordance with some exemplary embodiments of the disclosed subject matter.

Referring now to FIG. 2, showing a Set of Lenses 200 in accordance with some exemplary embodiments of the disclosed subject matter. The Set of Lenses 200 comprises a First Ophthalmic Lens 250 and a Counterpart Ophthalmic Lens 210.

First Ophthalmic Lens 250 comprises an Intermediate Focal Zone 260. The Intermediate Focal Zone 260 may be located vertically between a First Focal Portion 270 and a Fourth Focal Portion 276. The Intermediate Focal Zone 260 may comprise a Second Focal Portion 272 and a Third Focal Portion 274.

Gradient 265 is a gradient change in optical power between the optical power of the First Focal Portion 270 and the optical power of the Fourth Focal Portion 276 of the First Ophthalmic Lens 250. In some exemplary embodiments, Gradient 265 is a continuous gradient in optical power of the Intermediate Focal Zone 260.

Gradient 280 is a gradient change in optical power between the optical power of the First Focal Portion 270 and the optical power of the Second Focal Portion 272. Similarly, Gradients 282, 284 are gradient changes in optical power between 272 and 274, and between 274 and 276 respectively.

In some exemplary embodiments, Gradients 280, 282, 284 are of constant change rate, constant derivative of the change, or the like. Gradients 280, 282, 284 are composed by Gradient 265 which is a continuous gradient. Gradient 265 may be produced without taking into consideration 272, 274 or other Intermediate Focal portions.

Counterpart Ophthalmic Lens 210 comprises an Intermediate Focal zone 220. The Intermediate Focal Zone 220 may be located vertically between a First Focal Portion 230 and a Fourth Focal Portion 236. The Intermediate Focal Zone 220 may comprise a Second Focal Portion 232 and a Third Focal Portion 234.

Gradient 240 is a gradient change in optical power between the optical power of the First Focal Portion 230 and the optical power of the Second Focal Portion 232. Similarly, Gradients 242, 244 are gradient changes in optical power between 232 and 234, and between 234 and 236 respectively.

In some exemplary embodiments, the location of the First Focal Portion 230, Second Focal Portion 232, Third Focal Portion 234 and Fourth Focal Portion 236 on the Counterpart Ophthalmic Lens 210 may be determined as described in Step 150 of FIG. 1. Additionally or alternatively, the First Focal Portion 230, Second Focal Portion 232, Third Focal Portion 234 and Fourth Focal Portion 236 may be located at corresponding positions to positions of the intermediate focal portions associated with same distances, in the ophthalmic lens. In some exemplary embodiments, the corresponding position may be substantially parallel position, such as at the same height. Additionally or alternatively, the focal portions located at the same height on both lenses may be located on the intermediate zone of the progressive lens.

In some exemplary embodiments, Gradients 240, 242, 244 may be of different change rates. Additionally or alternatively, the rate of gradient change of optical power of Gradient 240, located between the First Focal Portion 230 and the Second Focal Portion 232 of the Counterpart Ophthalmic Lens 210, may be different from the rate of gradient change of optical power of Gradient 280 located between the First Focal Portion 270 and the Second Focal Portion 272 of the First Ophthalmic Lens 250. Similarly there may be a difference in the rate of gradient change of optical power of Gradients 242, 244 located between the Second Focal Portion 232 the Third Focal Portion 234 and the Fourth Focal Portion 236 of the Counterpart Ophthalmic Lens 210, and the rate of gradient change of optical power of Gradients 282, 284 located between the Second Focal Portion 272, the Third Focal Portion 274 and the Fourth Focal Portion 276 of the First Ophthalmic Lens 250 respectively.

In some exemplary embodiments, Gradients 240, 242 and 244 may each have different change rate, different derivate of the change, or the like. Additionally or alternatively, Gradients 240, 242, and/or 244 may have a different change rate and/or a different derivate of the change rate than Gradients 280, 282, and/or 284, respectively.

In some exemplary embodiments, the First Focal Portion 270 and First Focal Portion 236 may be associated with a distance or a range of distances that may be considered as "far". Additionally or alternatively, the Fourth Focal Portion 276 and Fourth Focal Portion 236 may be associated with a distance or a range of distances, which are considered as "near". In some exemplary embodiments, the First Focal Portion 270 and First Focal Portion 230 may be located adjacent to a rim of the Intermediate Focal Zones 260, 220 respectively. Additionally or alternatively, the Fourth Focal Portion 276 and Fourth Focal Portion 236 may be located adjacent to another rim of the Intermediate Focal Zones 260, 220 respectively.

In some exemplary embodiments, a machine may be used to produce the First Ophthalmic Lens 250 and/or Counterpart Ophthalmic Lens 210. The machine may be configured to receive as input prescription for a first and second eyes of a subject indicating focal power required for each of the first and second eyes with respect to at least three distances. The machine may perform optical computations to determine the gradient needed for the lenses. In some exemplary embodiments, the machine may cut a raw material in accordance with the optical computations to produce each lens.

The disclosed subject matter may be applied with respect to any number of different distances. In some exemplary embodiments, there may be sufficient number of different distances which may provide an effect of having prescription for a continuous range of distances. Thereby, lenses produced using the seemingly continuous range of distances may provide the subject using the lenses with clear vision at the range of distances. In some exemplary embodiments, and as an example only, seemingly continuous range of distances may comprise distances at a difference within a range from one another (e.g., no more than 10%, no less than 1%, no more than 10 cm, no less than 1 cm, combination thereof, or the like), or the like.

Figure 3:
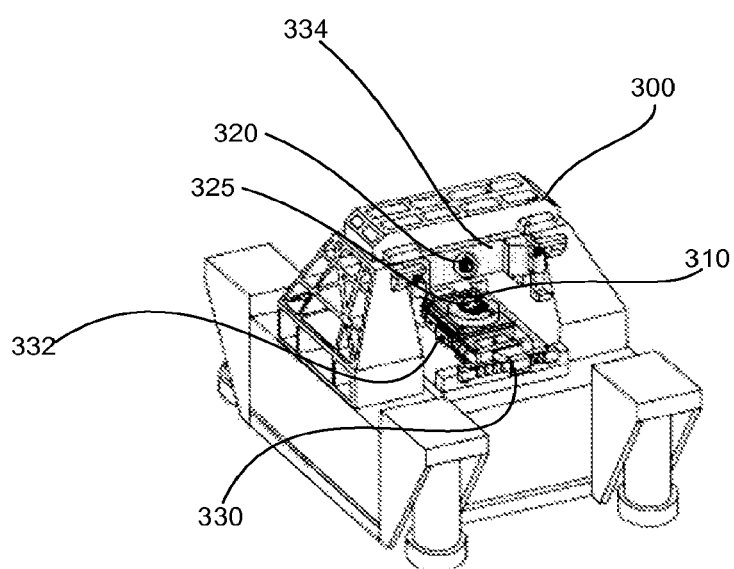
FIG. 3 shows an apparatus for producing lenses, in accordance with some exemplary embodiments of the disclosed subject matter.

FIG. 3 shows an apparatus for producing lenses, in accordance with some exemplary embodiments of the disclosed subject matter. Apparatus 300 is configured to produce lenses based on a description thereof. In some exemplary embodiments, Apparatus 300 may receive a prescription associated with a pair of eyes with respect to at least three distances and produce a pair of progressive lenses having at least three substantially parallel portions, each adapted to provide focus for the respective eye for a different distance of the at least three distances. In some exemplary embodiments, Apparatus 300 may produce lenses such as depicted in FIG. 2.

In some exemplary embodiments, the description of the lenses may be a power design. In some exemplary embodiments, to create a power design, a system of equations with numerous unknowns may be solved. Based on the computation process, an iteration process in which the computed surface is adapted to a desired surface may be performed repeatedly. In some exemplary embodiments, the iteration process may be performed by a processor and may be guided by an optical designer.

Apparatus 300 may be a grinding machine that transfers power design to a surface. In some exemplary embodiments, Apparatus 300 may be a numerically controlled grinding machine.

In some exemplary embodiments, a grinding wheel of Apparatus 300 turns about the y-axis, while the lens is rotated about the z-axis. In some exemplary embodiments, a carriage for the work piece runs on hydrostatic bearings and may be guided past the lens along the x-axis. In some exemplary embodiments, the carriage moves at the same time towards or away from the lens along the z-axis.

In some exemplary embodiments, grinding process commences from the center of the lens and may be performed in a spiral grinding pattern. In some exemplary embodiments, after grinding is completed the lens may be polished.

Apparatus 300 may grind a Workpiece 310. Apparatus 300 may achieve different grinding of Workpiece 310 using X-axis Slider 330, Y-axis Slider 332, Z-axis Slider 334 which may change a X,Y,Z coordinates of the grinder with respect to Workpiece 310. Apparatus 300 may achieve different angel of grinding using B-axis Rotary Table 320 and C-axis Rotary Table 325.

The flowchart and block diagrams in the Figures illustrate the architecture, functionality, and operation of possible implementations of systems, methods and computer program products according to various embodiments of the present disclosed subject matter. It should also be noted that, in some alternative implementations, the functions noted in the block may occur out of the order noted in the figures. For example, two blocks shown in succession may, in fact, be executed substantially concurrently, or the blocks may sometimes be performed in the reverse order, depending upon the functionality involved.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A first lens and a second lens,
    wherein the first and second lenses are progressive lenses that are configured to provide optical power required by two eyes of a subject to achieve focus at least at a far distance and at a close distance;
    wherein the first lens comprises a uniform gradient in optical power between the optical power required to achieve focus at the close distance and the optical power required to achieve focus at the far distance; and
    wherein the second lens comprises a non-uniform gradient in optical power between the optical power required to achieve focus at the close distance and the optical power required to achieve focus at the far distance.

2. The first lens and the second lens of claim 1, wherein the non-uniform gradient in optical power of the second lens comprises at least two different change rates.

3. The first lens and the second lens of claim 2, wherein the uniform gradient in optical power of the first lens is of a constant change rate.

4. Corrective eyeglasses comprising the first and second lenses of claim 1.

5. Contact lenses comprising the first and second lenses of claim 1.

6. A machine configured to produce the lenses of claim 1 based on a prescription for the two eyes indicating the optical power required by the two eyes to achieve focus at least at the far distance and at the close distance.

7. A method comprising:
    performing an eye exam to a subject having a first and second eye;
    determining a first prescription for the first eye and a second prescription for the second eye, wherein the first and the second perceptions describe focal powers required by the first and the second eyes respectively, to achieve focus at least at a far distance and a close distance;
    providing the first and second prescriptions to produce progressive glasses that comprise a first and second lenses,
        wherein the first lens comprises a uniform gradient in optical power between the optical power required to achieve focus at the close distance and the optical power required to achieve focus at the far distance; and
        wherein the second lens comprises a non-uniform gradient in optical power between the optical power required to achieve focus at the close distance and the optical power required to achieve focus at the far distance.

8. The method of claim 7, wherein said providing comprises providing the first and second prescriptions to a machine that is configured to produce lenses.

9. The method of claim 8 further comprising producing, by the machine, the progressive glasses.

10. A method comprising:
    obtaining a first prescription for a first eye of a subject, wherein the first prescription comprises optical powers at least at a far distance, at an intermediate distance and at a close distance;
    obtaining a second prescription for a second eye of the subject, wherein the second prescription comprises optical powers at least at the far distance, the intermediate distance and at the close distance;
    planning a first lens for the first eye based on the optical powers at the far distance and at the close distance;
    utilizing the first prescription for the intermediate distance to identify a location in the first lens;
    planning a second lens for the second eye based on the second prescription and based on the identified location in the planned first lens; and
    producing the first and second lenses.

* * * * *